United States Patent
Barton et al.

(10) Patent No.: US 6,895,318 B1
(45) Date of Patent: May 17, 2005

(54) OVERSTEER STEERING ASSISTANCE CONTROLLER

(75) Inventors: Andrew Dennis Barton, Coventry (GB); James Owen Patrick Farrelly, Kenilworth (GB); Nicholas Alford, Koblenz (DE)

(73) Assignee: TRW Limited (GB)

( * ) Notice: Subject to any disclaimer, the term of this patent is extended or adjusted under 35 U.S.C. 154(b) by 0 days.

(21) Appl. No.: 10/666,737

(22) Filed: Sep. 19, 2003

Related U.S. Application Data (63) Continuation of application No. PCT/GB02/01333, filed on Mar. 20, 2002.

(30) Foreign Application Priority Data

Mar. 20, 2001 (GB) .............................................. 0106924

(51) Int. Cl.⁷ ................................................. B62D 6/00
(52) U.S. Cl. ............................. 701/42; 701/41; 180/204
(58) Field of Search .............................. 701/41, 42, 48, 701/70, 71; 180/204, 6.2, 6.24

(56) References Cited

U.S. PATENT DOCUMENTS

| 5,341,297 | A   |   | 8/1994 | Zomotor et al. |
|-----------|-----|---|--------|----------------|
| 5,528,497 | A   |   | 6/1996 | Yamamoto et al. |
| 6,349,789 | B1  | * | 2/2002 | Nakano et al. ............. 180/446 |
| 6,580,995 | B1  |   | 6/2003 | Batistic et al. |

FOREIGN PATENT DOCUMENTS

| DE | 41 23 235  | 11/1992 |
|----|------------|---------|
| DE | 198 32 484 | 8/1999  |

* cited by examiner

Primary Examiner—Yonel Beaulieu
(74) Attorney, Agent, or Firm—MacMillan, Sobanski & Todd, LLC (57) ABSTRACT

A steering assistance controller for the generation of a compensating torque which assists the driver in overcoming the tendency of a vehicle to oversteer by encouraging the driver to steer the vehicle back to a non-steering condition through the application of said compensating torque which is based substantially upon an estimate of magnitude of oversteer.

13 Claims, 4 Drawing Sheets

OVERSTEER STEERING ASSISTANCE CONTROLLER

CROSS REFERENCE TO RELATED APPLICATIONS

This application is a continuation of International Application No. PCT/GB02/01333 filed Mar. 20, 2002, the disclosures of which are incorporated herein by reference, which claimed priority of Great Britain Patent Application No. 0106924.4 filed Mar. 20, 2001, the disclosures of which are incorporated herein by reference.

BACKGROUND OF THE INVENTION

The present invention relates to a vehicle dynamic control system of the type that employs an electrically assisted steering system (EAS) and has means to counter the effects of vehicle oversteer.

EAS systems are well known in the art. Electric assist steering systems that use, for example, a rack and pinion gear set to couple the steering column to the steered axle provided power assist by using an electric motor to either apply rotary force to a steering shaft connected to a pinion gear, or apply linear force to a steering member having rack teeth thereon. The electric motor in such systems is typically controlled in response to (a) driver's applied torque to the steering wheel, and (b) sensed vehicle speed.

Other known electric assist steering systems include electro-hydraulic systems in which the power assist is provided by hydraulic means under at least partial control of an electronic control system.

Oversteer is the tendency of a vehicle to steer into a sharper turn than the driver intends and where there can be a thrusting of the rear of the vehicle outwardly of the bend, causing the rear of the car to start to slide due to the rear tyres losing lateral traction. This type of event is considered the most dangerous condition for a vehicle to be in and frequently results in the vehicle spinning out of control. Vehicle Stability Control (VSC) systems have been developed that prevent this by selectively applying the brakes at individual wheels. Such systems are expensive and therefore only suited for fitment to higher end cars, whereas power steering systems are now fitted to almost all types of vehicle. Therefore an overseer assistance system that could use the steering system would not only assist VSC in stabilising the vehicle, but would also be of more widespread application.

SUMMARY OF THE INVENTION

It is therefore an object of the present invention to use the power steering system to aid the driver in stabilizing the vehicle during an oversteer condition.

According to the present invention a steering assistance controller is provided for the generation of a compensating torque which assists the driver in overcoming the tendency of a vehicle to oversteer by encouraging the driver to steer the vehicle back to a non-oversteering condition through the application of said compensating torque which is based at least in part upon vehicle state information. Preferably, the vehicle state information is comprised of one or more of vehicle yaw rate, lateral acceleration, vehicle side slip, longitudinal velocity, lateral velocity, steering wheel angle, steering wheel velocity, driver applied steering torque and yaw acceleration.

An algorithm is provided that uses measurements of the vehicle dynamic state to determine a steering correction suitable to stabilise a vehicle in oversteer, this steer correction being applied to the vehicle via the normal power assisted steering system.

Preferably, the steering assistance controller derives an estimation of the tendency of the vehicle to oversteer based upon measurements the measured or derived vehicle yaw rate, and/or, lateral acceleration, and/or steering wheel angle, and/or lateral acceleration and/or slip angle.

Such data is readily available from known ABS systems of the VSC (Vehicle Stability Control) type where stability of the vehicle is further enhanced through selective application of the vehicle braking system.

Preferably, the steering assistance controller is adapted to derive the estimation of the tendency of the vehicle to oversteer based upon estimates of vehicle yaw rate which are compared with measurements of actual vehicle yaw rate to provide a yaw rate error which is used as a measure of oversteer present on the vehicle.

In one advantageous embodiment, the steering controller includes a closed loop observer having yaw rate feedback which is arranged such that, when the vehicle starts to oversteer, a non-linear region is entered and the previously existing linear estimate diverges from the feedback signal whereby the magnitude of the vehicle yaw rate is greater than the magnitude of the estimated yaw rate, thereby producing a negative yaw rate error which is used to generate a proportional signal indicative of the magnitude of the oversteer.

Preferably, the steering assistance controller is adapted to derive the estimation of the tendency of the vehicle to oversteer using measurements from lateral acceleration sensors placed in the front and rear axles of the vehicle.

In one embodiment, signals corresponding to the lateral accelerations measured at the front and rear axles are passed through a phase detection device, the phase difference being used for calculation of the magnitude of oversteer.

Conveniently, the state of the vehicle is formed from $\lambda \approx \Theta_{th} \Theta$ where $\lambda$ is the vehicle state, $\Theta_{th}$ is a phase lag threshold and $\Theta$ is the phase difference between the two lateral acceleration sensors, positive values of $\lambda$ indicating that the vehicle is in oversteer and $\lambda$ is proportional to the amount of oversteer present.

In other embodiments, the steering controller can be adapted to derive an estimation of the tendency of the vehicle to oversteer based upon two vehicle models representing an understeering and an oversteering vehicle which are compared to provide an indication of vehicle oversteer magnitude.

Advantageously, the difference in dynamics between the two models is achieved by altering the tyre cornering stiffnesses in the models, reducing the front tyre stiffness in one model creating an understeering vehicle and reducing the rear tyre stiffness in the other model creating an oversteering vehicle, and comprising comparators which calculate the error between the measured lateral acceleration and estimated lateral acceleration at that axle for each model, based on:

$$\lambda_f = |A_{fm} - A_{fu}| - |A_{fm} - A_{fo}|$$

where $A_{fu}$=Front Axle Lat Acc Estimated from Understeer Model $A_{ru}$=Rear Axle Lat Acc Estimated from Understeer Model $A_{fo}$=Front Axle Lat Acc Estimated from Oversteer Model $A_{ro}$=Rear Axle Lat Acc Estimated from Oversteer Model $A_{fm}$=Front Axle Lat Acc Measured from Sensor
$A_{rm}$=Rear Axle Lat Acc Measured from Sensor this giving two values for the vehicle state which are added together to produce an overall vehicle stability factor λ, positive values of which are indicative of vehicle oversteer.

In still further embodiments, the steering assistance controller is adapted to derive an estimation of the tendency of the vehicle to oversteer based upon a percentage of the VSC threshold at which brake intervention for oversteer occurs.

Preferably, the steering controller includes a steering controller which generates an input to the vehicle steering system based on the amount of estimated vehicle oversteer.

Advantageously, the steering assistance controller is adapted to control the steering by applying a pulse input or "nudge" to indicate to the driver the correct time and direction to apply steering control.

In one embodiment, a signal is arranged to be generated in a nudge controller if the vehicle yaw rate error is detected to be greater than a predetermined threshold, this signal being used to trigger a latch, the output of which sets an integrator ramping, said signal also being used to generate a torque demand signal which is fed to the steering system to initiate the start of the "nudge", saturation of the integrator resetting the latch and ending the "nudge".

Advantageously, the steering assistance controller is adapted to control the steering by means of closed loop control of the steering wheel velocity.

In one embodiment, a PD controller is implemented on the vehicle yaw rate error to generate a steering rate demand which is compared with a scaled version of the steering wheel velocity to produce an error signal, a second PD controller then providing a signal which attempts to move the steering wheel with a desired direction and velocity to correct the oversteer.

The steering assistance control can also include an activation control which is adapted to fade the controller in when it has decided that the oversteer has exceeded limits and to fade the controller out once the oversteer has returned to an acceptable value.

Preferably, the activation control comprises activation logic which is adapted to control the point at which the controller starts, deactivation logic which detects conditions for deactivation of the controller, and a fade control which fades the inputs and outputs from the controller in and out as the controller is switched on and off.

Advantageously, the activation logic comprises a threshold oversteer value and a latch arranged such that when the oversteer signal exceeds the threshold, the latch is set and remains set until a deactivation flag triggers a reset.

The fade control can comprise an integrator which, upon detection of an activation flag being high, is arranged to ramp up to allow the torque generated by the steering controller to be gradually added to the steering system but which, on detection of the activation flag becoming low, ramps down to gradually remove the effect of the controller torque from the steering system.

Various objects and advantages of this invention will become apparent to those skilled in the art from the following detailed description of the preferred embodiment, when read in light of the accompanying drawings.

DETAILED DESCRIPTION OF THE INVENTION

Figure 1:
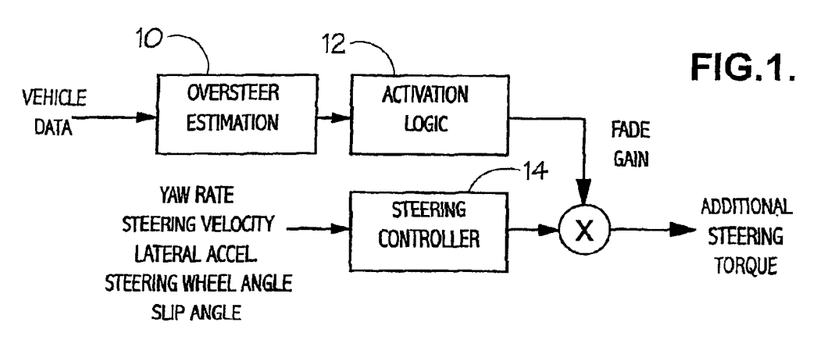
FIG. 1 is an overall system block diagram of one embodiment of an oversteer steering assistance controller in accordance with this invention.

Referring first to FIG. 1, the oversteer steering assistance controller comprises three sections, namely:

Oversteer Estimation. The Oversteer Estimation 10 attempts to estimate the amount of oversteer that the vehicle is currently experiencing.

Steering controller. Based on the amount of oversteer, the Steering Controller 14 generates an input to the steering system to assist the driver in correction.

Activation Control. The Activation Control/Logic 12 fades the controller in when it has determined that the oversteer has exceeded limits. It also controls the fading out of the controller once the oversteer and other vehicle parameters have returned to acceptable values.

Oversteer Estimation (a) Integrated Estimation—VSC ICC Oversteer/Understeer Signal The Integrated Chassis System VSC code produces a measure of the vehicle understeer or oversteer. −100% is the point where brake intervention occurs to counter a severe understeer. 0% is the vehicle operating without any understeer or oversteer. +100% indicates the initiation of brake intervention to prevent a severe oversteer.

For the purposes of oversteer control, only positive values are taken, all negative values are ignored. There is no requirement for a limiter as the signal is inherently limited to 100%.

(b) Dynamic Estimation

Figure 2:
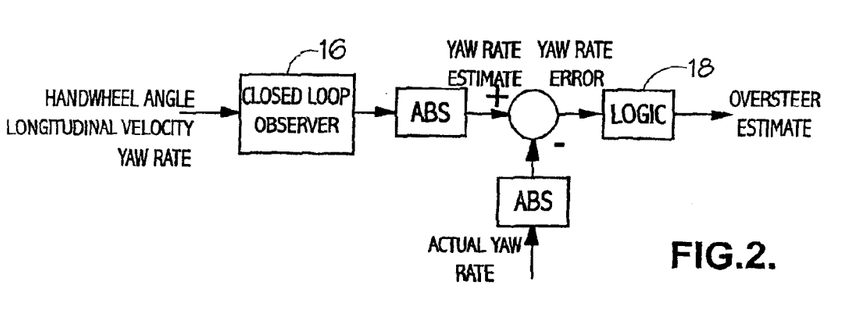
FIG. 2 illustrates how yaw rate is estimated.

The dynamic estimator is a closed looped observer 16 with yaw rate feedback, estimating yaw rate, as illustrated in FIG. 2. When the vehicle starts to oversteer, a non-linear region is entered and the linear estimate diverges from the feedback signal. In this condition, the magnitude of the vehicle yaw rate is greater than the magnitude of the estimated yaw rate, producing a negative yaw rate error. A logic block 18 detects the negative yaw rate error and outputs a signal that is proportional to the magnitude of the yaw rate error. This signal is a measure of the amount of oversteer present on the vehicle.

(c) Dynamic Estimation with Lateral Acceleration

It is possible to estimate the amount of oversteer on the vehicle using two lateral acceleration sensors, one placed on the front axle and one of the rear axle. There are a number of methods of achieving this, as explained hereinafter.

(d) Oversteer Estimation by Phase Detection

Figure 3:
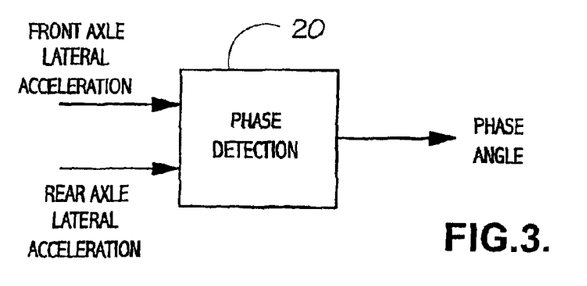
FIG. 3 illustrates oversteer estimation by Phase Detection.

As shown in FIG. 3. The lateral accelerations measured at the front and rear axles are passed through a phase detection device 20.

The phase detection device 20 uses a cross correlation to determine the time delay between the two signals. From this, the phase difference can be determined.

Once the phase between the front and rear lateral acceleration signals has been determined, the state of the vehicle can be found from:

$\lambda = \Theta_{th} - \Theta$ where $\lambda$ is the vehicle state, $\Theta_{th}$ is a phase lag threshold and $\Theta$ is the phase difference between the two lateral acceleration sensors. In normal driving conditions, the rear axle will tend to lag the front axle and this phase difference is set as the value of $\Theta_{th}$. Therefore, in normal driving $\lambda$ is around 0. As the vehicle starts to oversteer, the lateral acceleration of the rear axle catches up with the front axle, causing $\Theta$ to fall. In high values of oversteer, $\Theta$ can change sign, i.e. the lateral acceleration at the rear axle now leads that at the front axle. It can therefore be seen that positive values of $\lambda$ indicate that the vehicle is in oversteer and $\lambda$ is proportional to the amount of oversteer present on the vehicle.

(e) Oversteer Estimation by Model Comparison

Figure 4:
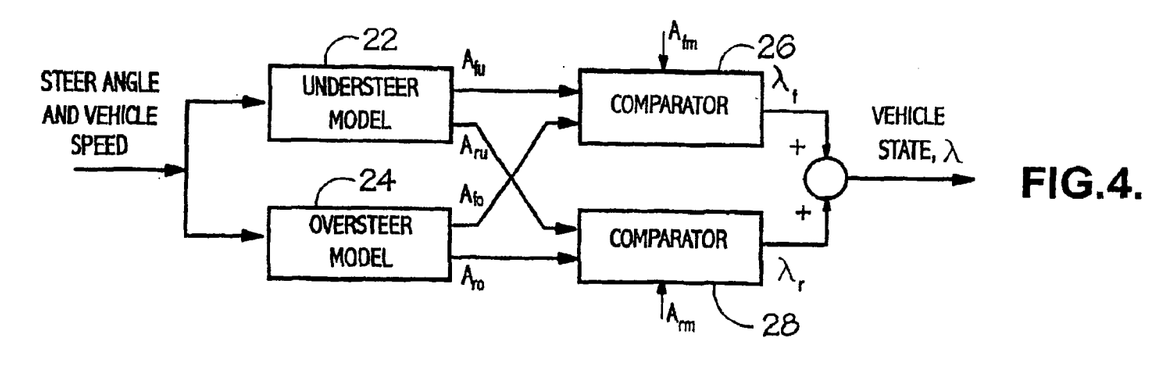
FIG. 4 illustrates oversteer estimation by Model Comparison.

As illustrated in FIG. 4, two vehicle models 22, 24, are created, representing an understeering and oversteering vehicle. The difference in dynamics between the models 22, 24 is achieved by altering the tyre cornering stiffness. Reduction of the front type stiffness by around a third creates an understeering vehicle, while a similar reduction for the rear creates oversteer.

Referring to FIG. 4, the following nomenclature applies:

$A_{fu}$=Front Axle Lat Acc Estimated from Understeer Model $A_{ru}$=Rear Axle Lat Acc Estimated from Understeer Model $A_{fo}$=Front Axle Lat Acc Estimated from Oversteer Model $A_{ro}$=Rear Axle Lat Acc Estimated from Oversteer Model $A_{fra}$=Front Axle Lat Acc Measured from Sensor $A_{nm}$=Rear Axle Lat Acc Measured from Sensor Comparators 26 and 28 first calculate the error between the measured lateral acceleration and the estimated lateral acceleration at that axle for each model:

$$\lambda_f = |A_{fm} - A_{fu}| - |A_{fm} - A_{fo}|;$$

$$\text{and } \lambda_r = |A_{nm} - A_{ru}| - |A_{nm} - A_{ro}|.$$

This gives two values for the vehicle state which are added together to produce an overall vehicle stability factor, $\lambda$, as given by the relationship:

$$\lambda = \lambda_f + \lambda_r.$$

For normal straight line driving, $\lambda$ should tend to [0] zero. As the vehicle generates more understeer, then $\lambda$ becomes negative. If the vehicle moves into oversteer, then $\lambda$ becomes positive. Therefore, $\lambda$ is proportional to the dynamic state of the vehicle.

Steering Controller

There are two possible methods of controlling the steering. The first is just to apply a pulse input, or a nudge, to indicate to the driver the correct time and direction to apply steering control. The alternative is more comprehensive and applies closed loop control of the steering wheel velocity.

(a) Nudge Control

Figure 5:
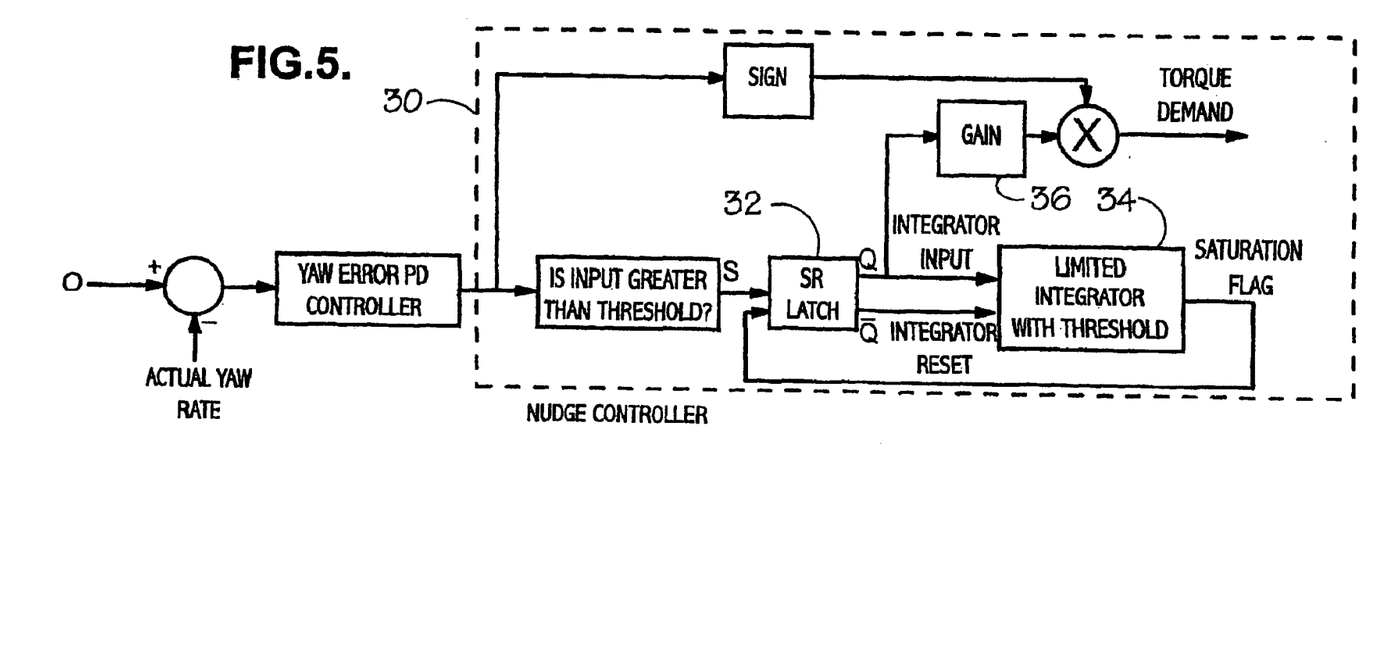
FIG. 5 is a block diagram of a "nudge" controller.

The nudge control uses a PD control on yaw rate with an additional output block 30 as illustrated in FIG. 5. The additional block 30 does nothing until the torque demand from the yaw rate controller reaches a threshold. Then a torque pulse is generated that is intended to nudge the driver into moving the vehicle in the correct direction.

A '1' is generated in the nudge controller 30 if the yaw rate error is greater than a threshold. This is used to trigger a set/reset latch 32, the output of which sets an integrator 34 ramping. At the same time, the '1' out of the SR latch 32 is scaled by a gain 36 and generates a torque, the start of the nudge. This is given the same sign as the torque error and fed to the steering system. In this implementation, the gain is constant and therefore the torque applied to the steering system is independent of the severity of the oversteer condition. It is possible to make this gain a map, with the index being either the oversteer value, yaw rate, or yaw acceleration. This would then change the amplitude of the steering nudge dependent on manoeurve. When the integrator 34 saturates, a flag is generated which causes the SR latch 32 to reset. When this occurs, the torque output to the steering system falls to zero ending the nudge, and the integrator 34 is reset. By varying the saturation value on the integrator 34, the duration of the applied steering nudge can be controlled.

(b) Steering Wheel Rate Control

Figure 6:
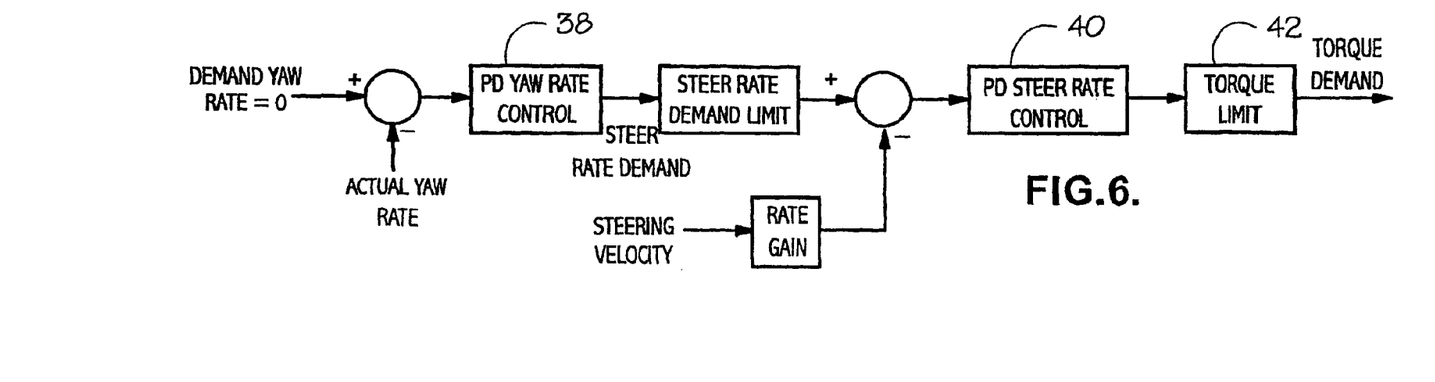
FIG. 6 is a block diagram of a steering wheel rate controller.

The aim of the closed loop steering wheel velocity controller, shown in FIG. 6 is to attempt to match the yaw rate of the front road wheels with the yaw rate of the vehicle but the opposite sign. This has the effect of causing the vehicle to seemingly pivot about the front wheels.

The controller assumes that the driver is attempting to reduce the yaw rate of the vehicle to zero and assists the driver in achieving this. However, if the system was combined with a video sensor capable of providing a heading angle demand, then this input could reflect a yaw rate demand required to keep the vehicle heading in the correct direction. In the first element 38, a PD controller is implemented on the yaw rate error signal to generate a steering rate demand. This is compared with a scaled version of the handwheel velocity to produce an error signal. A final PD controller 40 then attempts to move the handwheel with the desired direction and velocity. A limit 42 prevents the controller applying torques that may lead to excessive handwheel velocities.

Figure 11:
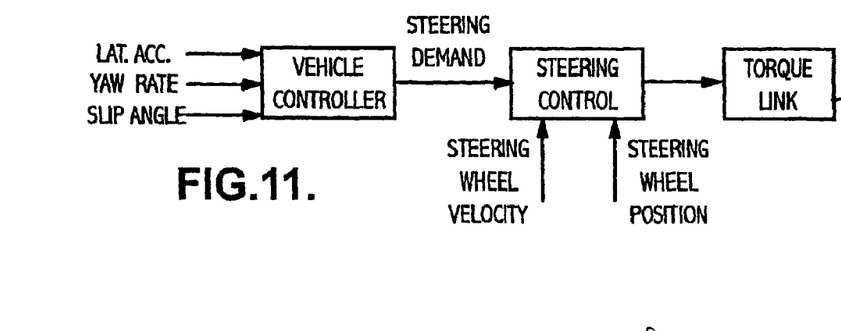
FIG. 11 shows an alternative steering controller.
Figure 12:
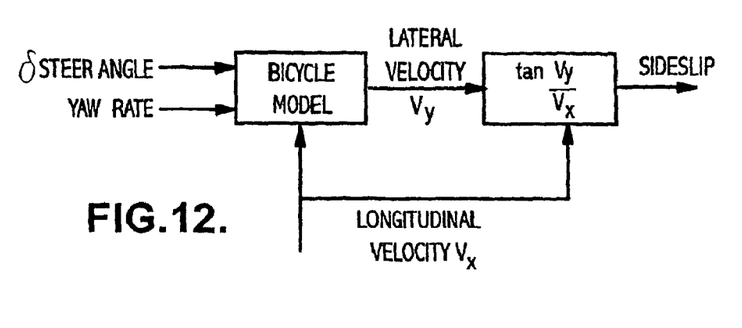
FIG. 12 shows a means of establishing slip angle.

As an alternative to the steering wheel rate controller of FIG. 6, there can be used the steering controller of FIG. 11 which has as one of its inputs a value corresponding to the vehicle side slip. Side slip can be established, by way of example, using the arrangement of FIG. 12. As shown in FIG. 12, side slip cangle can be generated from a combination of steer angle and yaw rate scaled for vehicle longitudinal velocity. The output of this combination when processed according to the bicycle model, produces vehicle lateral velocity. Further comparison of this value with vehicle longitudinal velocity produces a side slip angle which can then be fed into the vehicle controller to produce a steering demand as shown in FIG. 11.

The overall structure of the arrangement of FIG. 11 is substantially the same as for the steering rate controller with side slip as an input. The vehicle controller simply uses the inputs to determine a suitable output which is preferably either steering wheel angle/position. The Vehicle Controller itself can be one of a P, P+D, P+1+D, pole placement, frequency response commentator etc type controller.

By way of a specific solution, the simplest option is a gain on the controller inputs, each provided to scale the output based on the bicycle or other vehicle model. The gain outputs are then added together to form the steering demand signal which can be represented by steering wheel position demand or steering wheel velocity demand.

Similarly steering control function provides an output of steering torque based upon the inputs of steering wheel position and/or velocity when compared to the steering demand.

Activation Control

Figures 7, 8:
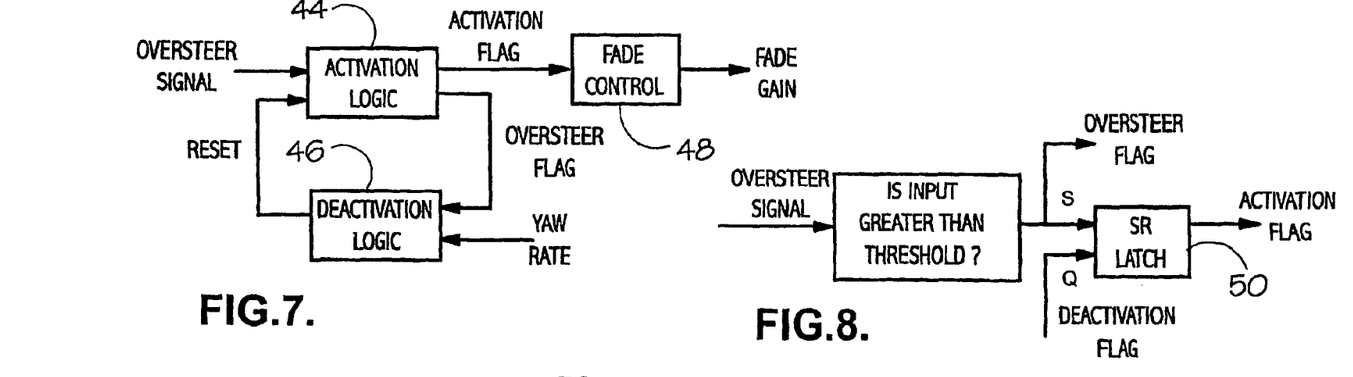
FIG. 7 is an overall block diagram of activation logic.
FIG. 8 is a block diagram of the activation logic.

The activation control illustrated in FIG. 7 comprises three separate sections:

(i) Activation Logic 44 which controls the point at which the controller starts by setting an activation flag high. It also stops the controller by setting the activation flag low.

(ii) Deactivation logic 46 which detects the necessary conditions for deactivation of the controller. When the required conditions are met, it sends a signal to the activation logic 44.

(iii) Fade Control 48 which produces a gain value between 0 to 1 that is used to fade the inputs and outputs from the controller in and out as the controller is switched on and off. The purpose of this is to effect bumpless transfer from controller off to controller on and back to controller off. At no time should the controller produce sudden changes in the steering torque other than those intended for the correction of oversteer.

(i) Activation Logic

The activation logic 44 merely comprises a threshold oversteer value and an SR latch 50 as shown in FIG. 8. When the oversteer signal exceeds the threshold, the latch 50 is set, and remains set until the deactivation flag triggers a reset.

(ii) Deactivation Logic

Figure 9:
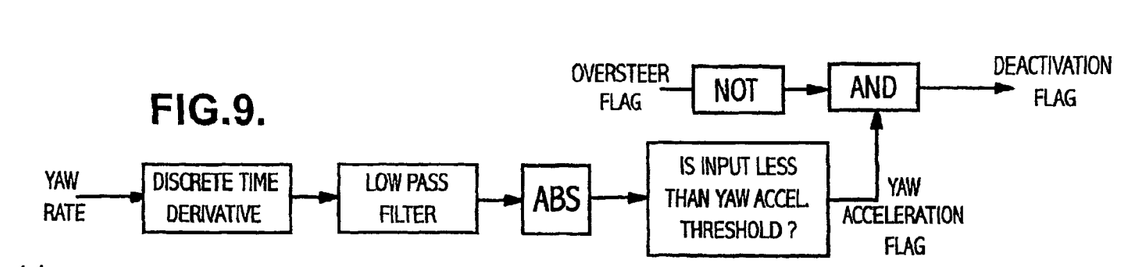
FIG. 9 is a block diagram showing deactivation logic.

As indicated in FIG. 9, two conditions must be satisfied before the deactivation flag goes high. They are:

1. Oversteer flag should not be set. If the oversteer signal is higher than the threshold that causes activation of the controller, then the controller should not be reset.
2. Yaw acceleration should be less than a threshold. A high yaw acceleration means that there is a large yaw moment present on the vehicle, which is possibly unstable. Therefore, the yaw acceleration must fall below a threshold before the activation flag can be reset.

(iii) Fade Control

Figure 10:
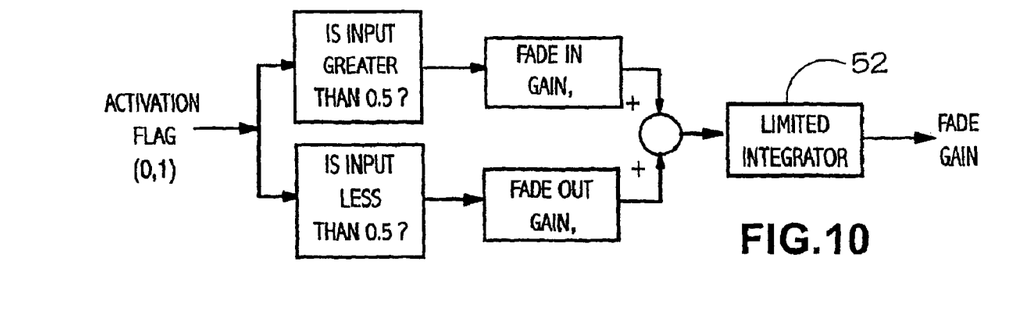
FIG. 10 is a block diagram of a fade control arrangement.

As illustrated in FIG. 10, the fade control block produces a gain between 0 and 1 that faces the control effort generated by the steering controller in and out in a smooth manner. When the activation flag is high, the output from the fade out gain is zero and the input to an integrator 52 is the value of the fade in gain. As the fade in gain is positive, the integrator 52 ramps up to 1 where it is saturated which allows the torque generated by the steering controller to be gradually added to the steering system. When the activation flag falls to zero, the output from the fade in gain falls to zero, the input to the integrator 52 is now the value of the fade out gain. As the fade in gain is negative, the integrator ramps down to zero where it saturates, gradually removing the effect of the controller torque from the steering system.

The rate at which the torque is faded, can be adjusted by selection of the fade in and fade out gains.

The aforegoing system is capable of achieving a number of advantageous operating characteristics, including one or more of the following:

(1) Hands off stability is obtained in that the vehicle is stable even if the driver removes their hands from the steering wheel. The steering automatically attains the correct steer angle.

(2) Vehicle stability is enhanced in that, for a vehicle fitted with VSC, both the steering and braking are acting to stabilise the vehicle, so that the vehicle should be returned to a safe operating region more rapidly.

(3) Less VSC (Vehicle Stability Control) intervention is necessary.

The VSC causes the vehicle to slow down. By arranging for the steering control to activate ahead of the VSC system, there will be less VSC action. The VSC could also be tuned to allow more oversteer as the steering control will be active.

(4) The system is applicable to cheaper vehicles in that stability control can be added to a less expensive vehicle where VSC would be a prohibitive extra cost but where power steering is standard.

(5) Smooth intervention is achieved in that the controller torque is progressively added to the power assist torque so that the control intervention is not objectionable to the driver.

(6) The degree of intervention can be tunable in that by tuning of the control gains and saturation elements, the type of control can be varied from one that guides the driver into making the correct steering input to a full interventionist system where the driver can not override the steering.

(7) There is minimal additional hardware necessary in that there are minimal additional hardware requirements beyond the base vehicle. Two cheap lateral acceleration sensors may be all that is required, if VSC is not actually fitted to the vehicle.

In accordance with the provisions of the patent statues, the principle and mode of operation of this invention have been explained and illustrated in its preferred embodiment. However, it must be understood that this invention may be practiced otherwise than as specifically explained and illustrated without departing from its spirit or scope.

What is claimed is:

1. A steering assistance controller for the generation of a compensating torque which assists a vehicle driver in overcoming the tendency of a vehicle to oversteer, the controller comprising:

a steering controller adapted to be connected to the vehicle steering system and operative to derive an estimation of the tendency of the vehicle to oversteer based upon estimates of vehicle yaw rate which are compared with measurements of actual vehicle yaw rate to provide a yaw rate error, said steering controller including a closed loop observer having yaw rate feedback which is arranged such that, when the vehicle starts to oversteer, a non-linear region is entered and the previously existing linear yaw rate estimate diverges from the feedback signal whereby the magnitude of the vehicle yaw rate is greater than the magnitude of the estimated yaw rate, thereby producing a negative yaw rate error which is used to generate a proportional signal indicative of the magnitude of the oversteer, said controller further operative to determine the compensating torque as a function of said proportional signal and to apply the compensation torque to the vehicle steering system to encourage the driver to steer the vehicle back to a non-oversteering condition.

2. A steering assistance controller for the generation of a compensating torque which assists a vehicle driver in overcoming the tendency of a vehicle to oversteer, the controller comprising:

a first lateral acceleration sensor placed in the front axle of the vehicle;

a second lateral acceleration sensor placed in the rear axle of the vehicle; and a steering controller connected to said first and second lateral acceleration sensors, said steering controller adapted to be connected to the vehicle steering system, said steering controller operative to receive a pair of acceleration measurements from said first and second lateral acceleration sensors and to derive an estimation of the tendency of the vehicle to oversteer using said measurements from said first and second lateral acceleration sensors, said steering controller further operative to determine the compensating torque as a function of said oversteer estimate and to apply the compensation torque to the vehicle steering system to encourage the deriver to steering the vehicle back to a non-oversteering condition.

3. The steering assistance controller as claimed in claim 2, wherein said steering controller includes a phase detection device and further wherein signals corresponding to the lateral accelerations measured at the front and rear axles are passed through said phase detection device, said phase detection device being operable to determine a phase difference between said first measurements from said first and second lateral acceleration sensors with said phase difference being used for calculation of the magnitude of oversteer.

4. The steering assistance controller as claimed in claim 3, wherein the state of the vehicle is formed from $\lambda=\Theta_{th}=\Theta$;

where $\lambda$ is the vehicle state, $\Theta_{th}$ is a phase lag threshold and $\Theta$ is the phase difference between said two lateral acceleration sensors, positive values of $\lambda$ indicating that the vehicle is in oversteer and $\lambda$ is proportional to the amount of oversteer present.

5. A steering assistance controller for the generation of a compensating torque which assists a vehicle driver in overcoming the tendency of a vehicle to oversteer, the controller comprising:

a steering controller adapted to be connected to the vehicle steering system, said steering controller operative to derive an estimation of the tendency of the vehicle to oversteer based upon a first vehicle model representing an understeering vehicle and a second vehicle model representing an oversteering vehicle which are compared to provide an indication of vehicle oversteer magnitude, said steering controller further operative to determine the compensating torque as a function of said oversteer estimate and to apply the compensation torque to the vehicle steering system to encourage the driver to steer the vehicle back to a non-oversteering condition.

6. A steering assistance controller for the generation of a compensating torque which assists a vehicle driver in overcoming the tendency of a vehicle to oversteer, the controller comprising:

a steering controller adapted to be connected to the vehicle steering system, said controller operative to derive an estimation of the tendency of the vehicle to oversteer based upon two vehicle models representing an understeering and oversteering vehicle which are compared to provide an indication of vehicle oversteer magnitude with a difference in dynamics between said two models being achieved by altering the tire cornering stiffnesses in the models, reducing the front tire stiffness in one model creating an understeering vehicle and reducing the rear tire stiffness in the other model creating an oversteering vehicle, and further including comparators which calculate the error between the measured lateral acceleration and estimated lateral acceleration at that axle for each model, based on:

$$\lambda_f=|A_{fm}-A_{fu}|-|A_{fm}-A_{fo}|;$$

and $\lambda_r=|A_{nm}-A_{ru}|-|A_{nm}-A_{ro}|;$ where $A_{fu}$=Front Axle Lat Acc Estimated from Understeer Model $A_{ru}$=Rear Axle Lat Acc Estimated from Understeer Model $A_{fo}$=Front Axle Lat Acc Estimated from Oversteer Model $A_{ro}$=Rear Axle Lat Acc Estimated from Oversteer Model $A_{fm}$=Front Axle Lat Acc Measured from a Sensor $A_{rm}$=Rear Axle Lat Acc Measured from a Sensor;

this giving two values for the vehicle state which are added together to produce an overall vehicle stability factor $\lambda$, as given by the relationship:

$$\lambda=\lambda_f+\lambda_r$$

where positive values of which are indicative of vehicle oversteer, said controller further operative to encourage the driver to steer the vehicle back to a non-oversteering condition through the application of the compensating torque.

7. A steering assistance controller for the generation of a compensating torque which assists a vehicle driver in overcoming the tendency of a vehicle to oversteer, the controller comprising:

a steering controller operative to derive an estimation of the tendency of the vehicle to oversteer based upon a percentage of the VSC threshold at which brake intervention in oversteer occurs such that the steering assistance controller is actuated before the VSC, said steering controller further operative to determine the compensating torque as a function of said oversteer estimate and to apply the compensation torque to the vehicle steering system to encourage the driver to steer the vehicle back to a non-oversteering condition.

8. A steering assistance controller for the generation of a compensating torque which assists a vehicle driver in overcoming the tendency of a vehicle to oversteer, the controller comprising:

a steering controller adapted to be connected to the vehicle steering system, said controller operative to detect that the vehicle is in an oversteer condition and to control the steering by applying a pulse input that generates a "nudge" to indicative to the driver the correct time and direction to apply steering control, said steering controller also including a nudge controller that generates a signal if the vehicle yaw rate error is detected to be greater than a predetermined threshold, this signal being used to trigger a latch, the output of which sets an integrator ramping, said signal also being used to generate a torque demand signal which is fed to the vehicle steering system to initiate the start of said "nudge", saturation of the integrator resetting the latch and ending said "nudge".

9. A steering assistance controller for the generation of a compensating torque which assists a vehicle driver in overcoming the tendency of a vehicle to oversteer, the controller comprising:

a steering controller adapted to be connected to the vehicle steering system, said steering controller including first and second PD controllers with said first PD controller implemented on a vehicle yaw rate error to generate a steering rate demand which is compared with a scaled version of the steering wheel velocity to produce an error signal, said second PD controller being responsive to said error signal to generate a signal which attempts to move the steering wheel with a desired direction and velocity to correct the oversteer.

10. A steering assistance controller for the generation of a compensating torque which assists a vehicle driver in overcoming the tendency of a vehicle to oversteer, the controller comprising:

a steering controller including an activation controller which is operative to fade said steering controller in which said activation controller has determined that the oversteer has exceeded a predetermined threshold and to fade said steering controller out when said activation controller has determined that the oversteer has returned to a value that is less than said predetermined threshold, said steering controller further operative to determine the compensating torque as a function of vehicle state information and to apply the compensation torque to the vehicle steering system to encourage the driver to steer the vehicle back to a non-oversteering condition.

11. A steering assistance controller for the generation of a compensating torque which assist a vehicle driver in overcoming the tendency of a vehicle to oversteer, the controller comprising:

a steering controller adapted to be connected to the vehicle steering system, said activation controller including activation logic which is adapted to control the point at which said steering controller starts, deactivation logic which detects conditions for deactivation of said steering controller, and a fade control which fades the inputs and outputs from said steering controller in and out as said steering controller is switched on and off, said steering controller operative to determine the compensating torque as a function of vehicle state information and to apply the compensation torque to the vehicle steering system to encourage the driver to steer the vehicle back to a non-oversteering condition.

12. The steering assistance controller as claimed in claim 11, wherein said activation logic comprises a threshold oversteer value and a latch arranged such that when the oversteer signal exceeds the threshold, the latch is set and remains set until a deactivation flag triggers a reset.

13. The steering assistance controller as claimed in claim 11 wherein said activation controller comprises an integrator which, upon detection of an activation flag being high, is operative to ramp up to allow the torque generated by the steering controller to be gradually added to the steering system, but which, on detection of the activation flag becoming low, ramps down to gradually remove the torque generated by the steering controller from the steering system.

* * * * *

UNITED STATES PATENT AND TRADEMARK OFFICE
CERTIFICATE OF CORRECTION

PATENT NO. : 6,895,318 B1
DATED : May 17, 2005
INVENTOR(S) : Andrew Dennis Barton et al.

It is certified that error appears in the above-identified patent and that said Letters Patent is hereby corrected as shown below:

Column 8,
Line 63, delete "deriver to steering" and insert -- driver to steer --.

Column 9,
Line 9, delete "$\lambda = \Theta_{th} = \Theta$" and insert -- $\lambda = \Theta_{th} - \Theta$ --.
Line 54, delete "$\lambda_r = |A_{nm} - A_{ru}| - |A_{nm} - A_{ro}|$" and replace with
-- $\lambda_r = |A_{rm} - A_{ru}| - |A_{rm} - A_{ro}|$ --.

Column 10,
Line 29, delete "indicative" and insert -- indicate --.
Line 60, delete "which" and insert -- when --.

Column 11,
Line 5, delete "assist" and insert -- assists --.

Signed and Sealed this

Nineteenth Day of July, 2005

JON W. DUDAS
*Director of the United States Patent and Trademark Office*